United States Patent [19]
Menchetti

[11] Patent Number: 5,464,302
[45] Date of Patent: Nov. 7, 1995

[54] EXTENDIBLE INTERCONNECTED C-STUDS

[75] Inventor: Robert J. Menchetti, Buffalo, N.Y.

[73] Assignee: National Gypsum Company, Charlotte, N.C.

[21] Appl. No.: 111,259

[22] Filed: Aug. 23, 1993

[51] Int. Cl.⁶ ................................. F16D 1/0; E04C 3/30
[52] U.S. Cl. ............... 403/335; 403/336; 403/340; 52/730.6; 52/731.1; 52/731.2; 52/731.5; 52/731.7; 52/731.8; 52/731.9
[58] Field of Search .................... 52/720, 730.6, 52/731.1, 731.2, 731.4, 731.5, 731.7, 731.8, 731.9, 732.1, 732.3; 403/335, 336, 340

[56] References Cited

U.S. PATENT DOCUMENTS

| | | | |
|---|---|---|---|
| 1,570,310 | 1/1926 | Ljungberg et al. | 52/730.6 |
| 2,356,309 | 8/1944 | Garbe | 52/731.7 |
| 2,508,032 | 5/1950 | Kennedy | 52/731.2 |
| 3,278,043 | 10/1966 | Kimpton | 52/720 |
| 3,606,418 | 9/1971 | Buker et al. | 52/726.2 |
| 4,461,134 | 7/1984 | Lowe | 52/732 |
| 4,870,794 | 10/1989 | Menchetti | 52/281 |
| 4,881,355 | 11/1989 | Bosl et al. | 52/731.7 |
| 5,079,884 | 1/1992 | Menchetti | 52/241 |
| 5,129,204 | 7/1992 | Palumbo | 52/720 |

Primary Examiner—Richard A. Bertsch
Assistant Examiner—Howard R. Richman
Attorney, Agent, or Firm—Marshall, O'Toole, Gerstein, Murray & Borun

[57] ABSTRACT

An extendible stud, consisting of two substantially identical C-studs each of which has opposed flanges of substantially different widths and inwardly turned lips at the flange outer edges, and each C-stud having an elongate central area in its web located at substantially the middle of said C-stud cross-section, which two C-studs are interconnected by the narrow flange of each being held within the channel formed by the wider flange and the associated lip and web of the other C-stud, and the elongate central areas of the webs of the two C-studs abutting one another.

13 Claims, 2 Drawing Sheets

EXTENDIBLE INTERCONNECTED C-STUDS

This invention relates to interconnectible C-shaped sheet metal studs and more particularly to an interconnected pair of C-studs, each of which has an inwardly extending web with a flat web center area, whereby the center areas of two C-studs press against each other, providing a slidable but tight friction fit of the interconnected studs with very loose-fitting interconnected flanges.

BACKGROUND OF THE INVENTION

Formed sheet metal studs are commonly used in erecting drywall partitions, most commonly having a C-shaped cross-section. Extendible C-shaped studs have been used wherein one C-stud is slid into another slightly larger C-stud, larger by an amount equal to the metal thickness, requiring unacceptably close tolerances.

Another form of sheet metal stud that has been proposed for drywall construction is a Z-shaped stud, wherein the two opposed flanges of the stud extend in opposite directions from the stud web.

U.S. Pat. Nos. 3,606,418 and 4,461,134 each disclose a modification of a Z-stud in which the two flanges each have an inwardly turned outer lip and one flange is slightly larger than the other, again by an undesirably exact amount equal to the metal thickness, whereby, according to the teachings, in each patent, a pair of like studs can be interconnected by rotating one of the studs of the like pair through 180° on a longitudinal axis, and placing the smaller flanges of each in the channels formed by the larger flanges and their adjacent webs and lips.

U.S. Pat. No. 5,079,884 discloses a Z-stud wherein a pair of like studs can be interconnected by rotating one of the studs through 180° and placing the smaller flanges of each in the channels formed by the larger channels, requiring less exact dimensions by including a raised ridge in the center of each web, which ribs press against each other.

SUMMARY OF THE INVENTION

The present invention consists of a C-stud in which the two flanges differ in width by considerably more than the thickness of the metal. Each flange has an inwardly angled lip along the outer edge, preferably at an angle of about 90° to the flange.

The central web of the C-stud extends angularly inwardly from each flange to a narrow, flat web center area. The web extends inwardly a distance equal to slightly greater than half the width of the wider flange.

Two similar C-studs of this novel structure can easily be combined into an extendible stud by rotating one stud 180° about its longitudinal axis and placing the narrow flange in each stud into the channel formed by the wider flange and adjacent web and lip of the other C-stud. The web center area of the two C-studs will then abut one another, holding the flanges in place, while permitting the two studs to be moved longitudinally relative to each other, providing an easily extendible and retractable stud.

The C-studs of the present invention are definitely more stable than Z-studs such as when self-tapping drywall screws are pressed against the flanges, particularly when two C-studs are interconnected, as compared to interconnected Z-studs.

Still further, a very strong and stable stud can be produced by interconnecting two of the novel C-studs throughout their entire lengths, a further improvement over the interlocked Z-studs.

It is an object of the present invention to provide a novel extendible sheet metal stud.

It is a further object to provide an extendible stud which requires only two parts, which two parts are of identical structure.

It is a still further object to provide a two-part extendible stud which is very easily assembled, does not require close tolerances, and permits easy extension and retraction while capable of firmly retaining any length at which it is set.

DESCRIPTION OF THE DRAWINGS

These and other objects and advantages of the invention will be more readily apparent when considered in relation to the preferred embodiments as set forth in the specification and shown in the drawings in which.

DESCRIPTION OF THE PREFERRED EMBODIMENTS

Figure 1:
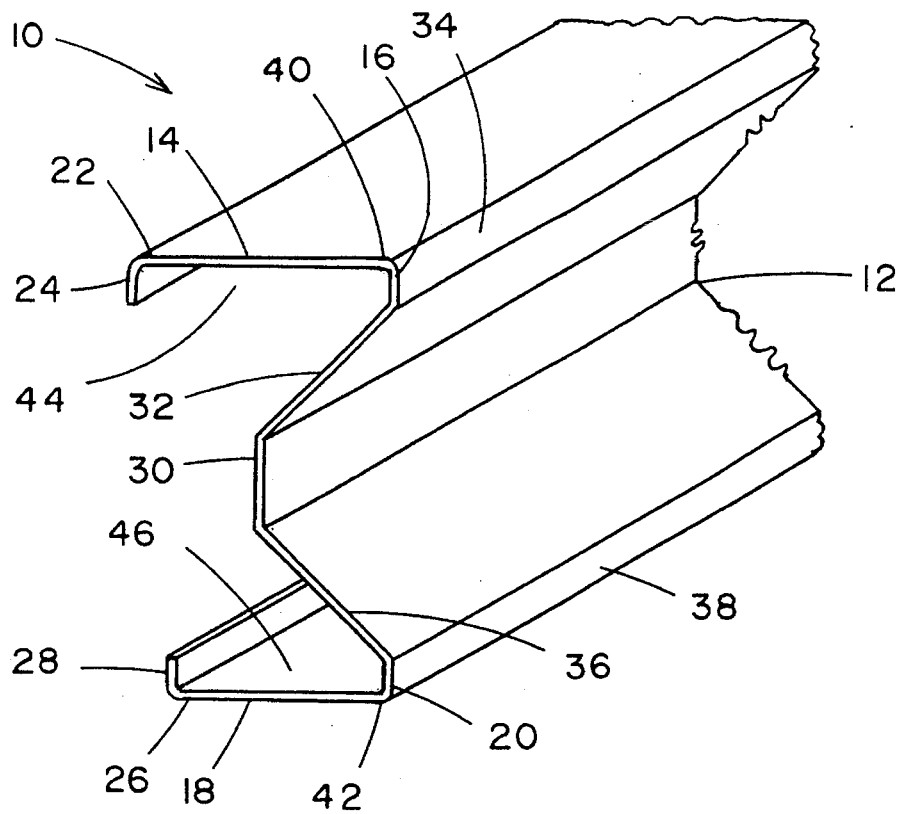
FIG. 1 is an isometric view of a C-stud formed in accordance with the present invention.

Referring to FIG. 1, there is shown an elongate, sheet metal, galvanized steel C-stud 10, formed with a generally C-shaped cross-section which has been modified specifically in accordance with the invention by having a web 12 which is bent inwardly. Stud 10 further includes an elongate relatively wide upper flange 14 shown extending to the left from the upper edge 16 of web 12 and an elongate relatively narrow flange 18 shown extending to the left from the lower edge 20 of web 12, parallel to flange 14. At the left outer edge 22 of upper flange 14 is a downwardly directed elongate lip 24 and at the left, outer edge 26 of the lower flange 18 is an upwardly directed elongate lip 28.

The web 12 joins the two flanges 14 and 18 and preferably consists of a narrow, flat central area 30, connected to upper flange 14 by an upper angled section 32 and a narrow connector portion 34 which is perpendicular to flange 14, and connected to lower flange 18 by a lower angled section 36 and a narrow connector portion 38 which is perpendicular to flange 18. The narrow connector portions 34 and 38 are connected to the right inner edges 40 and 42 of, respectively, the upper flange 14 and the lower flange 18. The narrow, flat central web area 30 of web 12 is located to the left of a plane passing through right inner edges 40 and 42, a distance equal to half the width of relatively wide upper flange 14.

Flanges 14 and 18, in combination with lips 24 and 28 and web 12, form, respectively, a wide channel 44 and a narrow channel 46.

In a preferred form of the invention, flanges 14 and 18 are spaced 2½ inches apart, flange 14 is 1½ inches wide, flange 18 is 1¼ inches wide, flat central area 30 is ½ inch wide, lips 24 and 28 are ¼ inch wide, connector portions 34 and 38 are ¼ inch wide and the metal is 0.020 inch thick.

Figure 2:
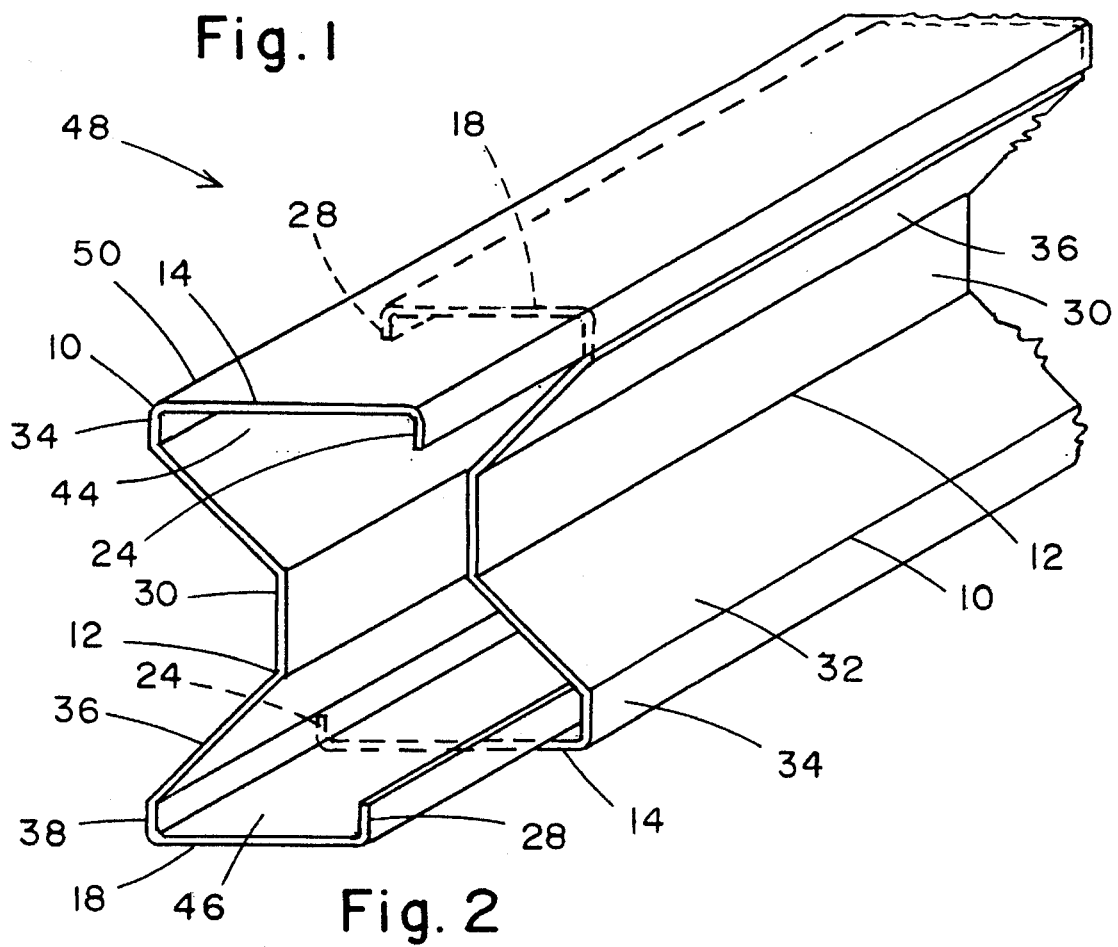
FIG. 2 is an isometric view of an extendible stud formed by interconnecting two studs similar to the stud of FIG. 1
Figure 3:
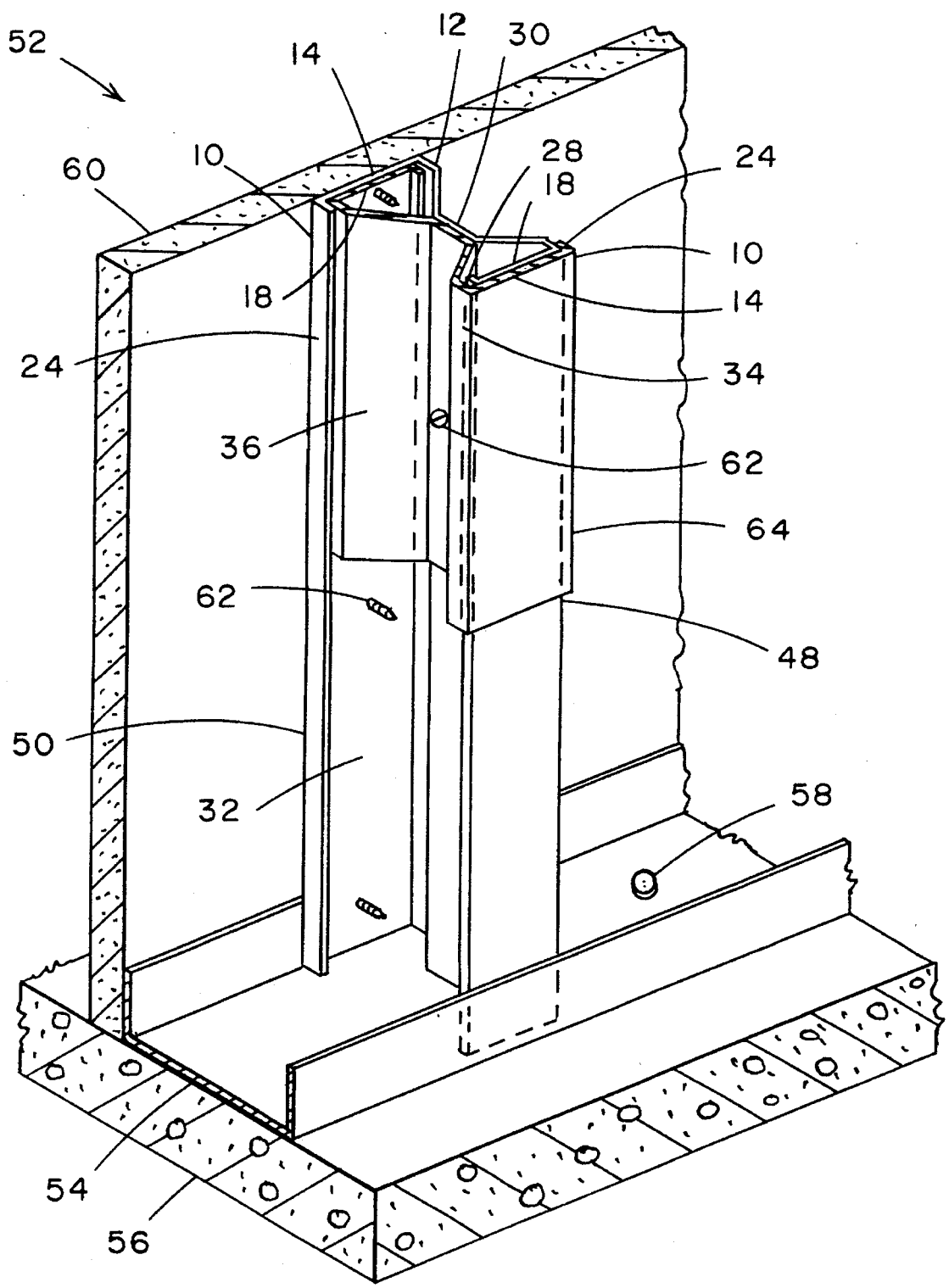
FIG. 3 is an isometric view of a partially constructed hollow partition including the extendible stud of FIG. 2 disposed in a floor track, and wallboards screw-attached to the extendible stud and to the floor track.

Referring to FIG. 2, an extendible stud 48 is shown which consists of two C-studs 10 which have been interconnected by rotating one of the two studs 180° about its longitudinal axis, and then inserting the narrow flange 18 of each stud 10 into the relatively wide channel 44 of the other stud. The two C-studs are preferably of the same length, and to form an extendible stud, the two studs are interconnected with at least one of the two C-studs 10 having an end portion 50 extending outwardly from the other of the two C-studs 10, for grasping and extending the extendible stud 48.

The narrow flanges 18 of each of the two C-studs 10 are substantially narrower than the wide flanges 14, by more than twice the metal thickness, however, with the flat central area 30, of each of the two C-studs 10, disposed against each other, the narrow flanges 18 are urged outwardly, fitting tightly against the lips 24 of the wide flange 14. After the narrow flange 18 of one C-stud 10 has been inserted in a wide channel 44 of the other C-stud 10, the other narrow flange 18 of the other C-stud 10 must be snapped into the wide channel 44 of the first C-stud 10, whereby each narrow flange 18 and its respective lip 28 are urged outwardly against a lip 24 of the opposite C-stud 10, by the abutting flat central areas 30.

The narrow flanges 18 are not smaller than the wide flanges by an amount equal only to the thickness of the metal, as in some of the prior art, the studs are more easily moved relative to one another than in such prior art.

As a result, a hollow, gypsum wallboard, drywall partition 52 is easily constructed by, first, affixing a floor track 54 to a floor 56 as by rivets 58, placing one end of an extendible stud 48 in the floor track 54, extending the length of the extendible stud 48 until the top of the extendible stud (not shown) fits into a standard ceiling track (not shown), or other suitable means for holding the extendible stud 48 in a vertical position, as will be clearly understood. The extended extendible stud 48, once inserted into floor and ceiling tracks, will remain in place without any further assistance, long enough to attach gypsum wallboards 60 to the extendible studs 48 and the floor and ceiling tracks by self-tapping drywall screws 62. Ceiling heights can typically vary from 6 feet to 10 feet using the same extendible stud 48.

Once the wallboards are screw-attached to the extendible studs 48, the screws 62, some of which could be placed to pierce the overlapping portion 64 of the extendible stud 48, will lock the two C-studs 10 of the extendible stud 48 into a fixed, desired length of the extendible stud 48. Screws 62 may also be placed through the abutting flat central areas 30 of two C-studs 10 of an extendible stud 48, to fix the length of the extendible stud 48.

The novel C-studs 10 are also suitable for extendible ceiling joists or grids or floor runners of considerable length by interconnecting three or more C-studs 10 and suspending or placing them in a horizontal disposition, extended to the length or width of a room.

Having completed a detailed description of the preferred embodiments of my invention so that those skilled in the art may practice the same, I contemplate that variations may be made without departing from the essence of the invention.

I claim:

1. A sheet metal C-stud, adapted for interconnecting with a like C-stud to form an extendible stud, said C-stud comprising an elongate web, an elongate first flange extending from one elongate edge of said web, a spaced, parallel elongate second flange extending from an opposite elongate edge of said web in the same direction from said web as said first flange, an elongate lip extending toward said second flange from an outer edge of said first flange, said lip forming a channel with said first flange and said web, and an elongate central area of said web, said central area being disposed within a plane parallel to a second plane which extends through said two elongate edges of said web, said two planes being spaced apart a distance substantially equal to half of the width of said first flange, and said first flange being wider than said second flange by approximately twice the sheet metal thickness.

2. A sheet metal C-stud as defined in claim 1, wherein said web central area is a flat, elongate area in a plane perpendicular to said flanges.

3. A sheet metal C-stud as defined in claim 1, wherein said web further comprises an upper angled portion and a lower angled portion, said angled portions extending from said central area toward said two elongate edges of said web.

4. A sheet metal C-stud as defined in claim 3, wherein said web further includes a connecting portion, perpendicular to said flanges, between said angled portions and said elongate edges of said web.

5. A sheet metal C-stud as defined in claim 1, wherein said first flange is about 1½ inches wide, said second flange is about 1¼ inches wide and said flanges are spaced apart about 2½ inches.

6. A sheet metal C-stud as defined in claim 1, wherein said C-stud is formed of galvanized sheet metal of about 0.02-inch thickness.

7. An extendible stud comprising two sheet metal C-studs adapted for interconnecting to form an extendible stud, each of said C-studs comprising an elongate web, an elongate first flange extending from one elongate edge of said web, a spaced, parallel elongate second flange extending from an opposite elongate edge of said web in the same direction from said web as said first flange, an elongate lip extending toward said second flange from an outer edge of said first flange, said lip forming a channel with said first flange and said web, and an elongate central area of said web, said central area being disposed within a plane parallel to a second plane which extends through said two elongate edges of said web, said two planes being spaced apart a distance substantially equal to half of the width of said first flange, and said first flange being wider than said second flange by approximately twice the sheet metal thickness, said C-studs being interconnected with said second flange of each C-stud being disposed in said channel formed by said first flange, said web and said lip of the other of said two C-studs, said first flange of each of said studs overlying said second flange of the other of said studs.

8. An extendible stud as defined in claim 7, wherein said central area of each said web is a flat area in a plane perpendicular to said flanges and said two central flat areas are abutting one another.

9. An extendible stud as defined in claim 7, wherein said two C-studs are of equal length.

10. An extendible stud as defined in claim 7, wherein said two C-studs are mechanically affixed together at said elongate central areas.

11. An extendible stud as defined in claim 8, wherein each of said C-studs is interconnected with another of said C-studs throughout substantially the full length of each said C-stud.

12. A hollow partition comprising a floor track, a plurality of sheet metal extendible studs, each of said extendible studs comprising two C-studs adapted for interconnecting to form an extendible stud, each of said C-studs comprising an elongate web, an elongate first flange extending from one elongate edge of said web, a spaced, parallel elongate second flange extending from an opposite elongate edge of said web in the same direction from said web as said first flange, an elongate lip extending toward said second flange from an outer edge of said first flange, said lip forming a channel with said first flange and said web, and an elongate central area of said web, said central area being disposed within a plane parallel to a second plane which extends through said two elongate edges of said web, said two planes being spaced apart a distance substantially equal to half of the width of said first flange, and said first flange being wider than said second flange by approximately twice the sheet metal thickness, said C-studs being interconnected with said second flange of each C-stud being disposed in said channel formed by said first flange, said web and said lip of the other of said two C-studs, said first flange of each of said studs overlying said second flange of the other of said studs, and a plurality of wallboards affixed to said flanges of said extendible studs, said extendible studs having one of said two C-studs extending vertically downward and engaging said floor track and another of said two C-studs extending vertically upward, and further comprising engaging means for holding said extendible studs in a vertical position.

13. A hollow partition as defined in claim 12, wherein said wallboards are affixed to said flanges by screws and wherein at least one of said screws, at each extendible stud, is screwed through an overlapping portion of the two C-studs of each extendible stud.

* * * * *

UNITED STATES PATENT AND TRADEMARK OFFICE
CERTIFICATE OF CORRECTION

PATENT NO.  :  5,464,302

DATED       :  November 7, 1995

INVENTOR    :  Menchetti

It is certified that error appears in the above-identified patent and that said Letters Patent is hereby corrected as shown below:

Column 4, line 54, "claim 8," should be --claim 7,--.

Signed and Sealed this

Twenty-fourth Day of September, 1996

Attest:

BRUCE LEHMAN

*Attesting Officer*        *Commissioner of Patents and Trademarks*